(12) United States Patent
Xiao et al.

(10) Patent No.: US 12,438,462 B2
(45) Date of Patent: Oct. 7, 2025

(54) SWITCHING CONVERTER AND OSCILLATOR THEREOF

(71) Applicant: SG MICRO CORP, Beijing (CN)

(72) Inventors: Fei Xiao, Beijing (CN); Xiang Yu, Beijing (CN)

(73) Assignee: SG MICRO CORP, Beijing (CN)

( * ) Notice: Subject to any disclaimer, the term of this patent is extended or adjusted under 35 U.S.C. 154(b) by 228 days.

(21) Appl. No.: 18/260,092

(22) PCT Filed: Oct. 21, 2021

(86) PCT No.: PCT/CN2021/125336
§ 371 (c)(1),
(2) Date: Jun. 30, 2023

(87) PCT Pub. No.: WO2022/142625
PCT Pub. Date: Jul. 7, 2022

(65) Prior Publication Data
US 2024/0055988 A1 Feb. 15, 2024

(30) Foreign Application Priority Data
Dec. 30, 2020 (CN) .......................... 202011601971.3

(51) Int. Cl.
*H02M 3/158* (2006.01)
(52) U.S. Cl.
CPC .................. *H02M 3/158* (2013.01)
(58) Field of Classification Search
CPC ........ H02M 1/12; H02M 1/42; H02M 1/4225; H02M 1/4233; H02M 1/4241;
(Continued)

(56) References Cited

U.S. PATENT DOCUMENTS

| 7,777,474 B2 | 8/2010 | Maekawa et al. |
| 2007/0285074 A1 | 12/2007 | Maekawa et al. |
| 2017/0201174 A1* | 7/2017 | Li .......................... H02M 1/08 |

FOREIGN PATENT DOCUMENTS

| CN | 101087105 A | 12/2007 |
| CN | 102291912 A | 12/2011 |

(Continued)

OTHER PUBLICATIONS

International Search Report and Written Opinion (including English translations) for International Application No. PCT/CN2021/125336, dated Dec. 16, 2021, 12 pages.

*Primary Examiner* — Bryan R Perez
(74) *Attorney, Agent, or Firm* — Westman, Champlin & Koehler, P.A.

(57) ABSTRACT

Disclosed are a switching converter and an oscillator thereof. The oscillator includes a charging current generating circuit and a clock signal generator circuit, which is used for generating a clock signal according to a charging current provided by the charging current generating circuit. The charging current generating circuit includes a variable resistor and a current limiting module. The current limiting module is used for limiting a current value of the charging current to a preset current value when the variable resistor is shorted or opened, thus avoiding drastic change of a switching frequency of the circuit when the external variable resistor is shorted or opened, so as to improve system stability.

15 Claims, 3 Drawing Sheets

(58) Field of Classification Search
CPC .. H02M 1/4258; H02M 1/425; H02M 1/4208; H02M 2001/4283; H02M 2001/4291; H02M 3/155–156; H02M 3/145; H02M 3/158; H02M 3/1582–1588; H02M 3/156; H02M 2003/1552
See application file for complete search history.

(56) References Cited

FOREIGN PATENT DOCUMENTS

| | | | |
|---|---|---|---|
| CN | 105634445 A | 6/2016 | |
| CN | 114204918 A | 3/2022 | |
| CN | 114696613 A | 7/2022 | |
| CN | 115549469 A | 12/2022 | |

\* cited by examiner

-Prior Art-

SWITCHING CONVERTER AND OSCILLATOR THEREOF

CROSS-REFERENCES TO RELATED APPLICATION

This application is a Section 371 National Stage application of International Application No. PCT/CN2021/125336, filed on Oct. 21, 2021, which published as WO 2022/142625 A1, on Jul. 7, 2022, not in English, and claims priority to Chinese patent application No. 202011601971.3, filed on Dec. 30, 2020, entitled "SWITCHING CONVERTER AND OSCILLATOR THEREOF", the contents of which are incorporated herein by reference in their entireties.

FIELD OF THE DISCLOSURE

The present disclosure relates to a technical field of semiconductor integrated circuits, and more particularly, to a switching converter and an oscillator of a switching converter.

DESCRIPTION OF THE RELATED ART

As portable electronic products become popular, switching power supplies are becoming increasingly important. Power supplies used in modern electronic devices can be roughly divided into linear regulation power supplies and switching regulation power supplies. A regulation transistor of a linear regulation power supply operates in an amplification region, which has advantages of no additional interference, good reliability, and low cost, but also has disadvantages of large volume and low conversion efficiency. Compared with linear regulation power supplies, switching regulation power supplies have characteristics of being capable of boosting and reducing voltage and having high power supply efficiency. However, when a switching regulation power supply regulates voltage and current, electromagnetic interference (EMI) noise may be generated. This kind of electrical noise can be transmitted to AC power line, which will not only affect operations of other electronic equipment near the power supply through conduction, but also may cause radiation or leakage from the power line, affecting an equipment which is not connected to the power line. These interferences will be significantly enhanced with increases of switching frequency and output power, posing a potential threat to normal operation of electronic equipment.

In order to suppress the electromagnetic interference of switching converters and make it meet the requirements of relevant electromagnetic compatibility standards, a switching converter according to the prior art adopts frequency jitter technology to increase the number of harmonics, so that the frequency can be dispersed. That is, by periodically changing the switching frequency, noise harmonic frequency can be dispersed and noise energy can be dispersed and reduced, ensuring amplitude margin across an entire frequency band, thus meeting the requirements of electromagnetic compatibility.

FIG. 1 shows a schematic structural diagram of a switching converter according to the prior art. As shown in FIG. 1, the switching converter 100 includes a control circuit and a power stage circuit which are integrated in a same integrated circuit chip. The control circuit includes an error amplifier EA, a logic driving circuit 110, an oscillator 120 and a PWM comparator 130.

The error amplifier EA is used to generate an error signal Verr according to a feedback voltage Vfb of an output voltage Vout and a reference voltage Vref. The PWM comparator 130 compares the error signal Verr with a slope voltage Vslope to obtain a comparison result and generates a pulse width modulated signal PWM according to the comparison result. The logic driving circuit 110 generates a switch driving signal according to the pulse width modulated signal PWM and a clock signal CLK supplied from the oscillator 120, and the switch driving signal controls power switch transistors MD1 and MD2 to be turned on and off.

The switching converter according to the prior art usually adopts analog method to adjust frequency, such as adjusting a charging current of the oscillator through an external adjusting resistor, so as to obtain the clock signal CLK with frequency variation. A disadvantage of this method is that a range of the frequency variation is particularly large in practical applications, for example, when the external adjusting resistor is short-circuited or open-circuited, the switching frequency will become particularly fast or slow, which reduces the stability of the system and may even leads to a damage of the chip.

SUMMARY OF THE DISCLOSURE

In view of this, an objective of the present disclosure is to provide a switching converter and an oscillator of a switching converter, for avoiding drastic changes in circuit switching frequency when an external adjustment resistor is short-circuited or open-circuited, thereby improving system stability.

According to one aspect of the present disclosure, there is provided an oscillator of a switching converter, and the oscillator includes: a charging current generating circuit for generating a charging current; a clock signal generator circuit for generating a slope voltage according to the charging current, comparing the slope voltage with a first reference voltage to obtain a comparison result, and generating a clock signal according to the comparison result; wherein, the charging current generating circuit includes a variable resistor and a current limiting module, and the current limiting module is used for limiting a current value of the charging current to a preset current value when the variable resistor is shorted or opened.

In some embodiment, the charging current generating circuit further includes: a first transistor and a second transistor being connected in series between a power supply voltage and the variable resistor; a fourth transistor being connected between the power supply voltage and the clock signal generator circuit, wherein the fourth transistor and the first transistor form a current mirror, and a second terminal of the fourth transistor is used for supplying the charging current; and an operational amplifier, which has a non-inverting input terminal being used for receiving a second reference voltage, an inverting input terminal being connected to a first node with a first terminal of the variable resistor, and an output terminal being connected to a control terminal of the second transistor, wherein, the operational amplifier is used for providing a feedback adjustment signal to the second transistor according to a node voltage of the first node and the second reference voltage, to adjust the current value of the charging current.

In some embodiment, the current limiting module is configured to adjust the feedback adjustment signal when the variable resistor is shorted or opened, to limit the current value of the charging current to the preset current value.

In some embodiment, the current limiting module includes: a first current source, with a first terminal being connected to the power supply voltage and a second terminal being connected to the first node; a second current source, having a first terminal being connected to a control terminal of the first transistor and having a second terminal being grounded; a third transistor and a sixth transistor being connected in series between the power supply voltage and ground, wherein the third transistor and the first transistor form a current mirror; and a fifth transistor being connected between the output terminal of the operational amplifier and ground, wherein the fifth transistor and the sixth transistor form a current mirror.

In some embodiment, the charging current generating circuit further includes a third current source being connected in parallel between a first terminal and a second terminal of the sixth transistor.

In some embodiment, output currents of the first current source and the second current source are equal.

In some embodiment, the clock signal generator circuit includes: a charging capacitor being connected between an output terminal of the charging current generating circuit and ground; a controllable switch having a first terminal being connected to a first terminal of the charging capacitor, and having a second terminal being grounded; and a comparator, having a non-inverting input terminal being connected to a connection node between the controllable switch and the charging capacitor, to receive the slope voltage, having an inverting input terminal for receiving the first reference voltage, and having an output terminal for outputting the clock signal, wherein the controllable switch is controlled to be turned on or off in accordance with the clock signal.

In some embodiment, each of the first transistor, the third transistor and the fourth transistor is a P-type metal oxide semiconductor field effect transistor, and each of the second transistor, the fifth transistor and the sixth transistor is an N-type metal oxide semiconductor field effect transistor.

According to another aspect of the present disclosure, there is provided a switching converter, including: a power stage circuit including a power switch transistor for converting an input voltage into an output voltage; an error amplifier for generating an error signal according to a third reference voltage and a feedback voltage of the output voltage; a PWM comparator for comparing the error signal with a slope voltage, to generate a pulse width modulated signal; a logic driving circuit for generating a switch driving signal according to the pulse width modulation signal and a clock signal, and controlling the power switch transistor to be turned on and off; and the oscillator according to embodiments of the present disclosure for generating the clock signal.

In some embodiment, a topology of the power stage circuit is selected from a group consisting of a Buck topology, a Boost topology, or a Buck-Boost topology.

The oscillator of the embodiment of the present disclosure comprises a charging current generating circuit and a clock signal generator circuit. The charging current generating circuit includes a variable resistor and a current limiting module, and the current limiting module is used to limit the current value of the charging current to a preset current value when the variable resistor is shorted or opened, thereby avoiding a drastic change on a switching frequency of the circuit when the external variable resistor is shorted or opened, improving the stability of the system.

BRIEF DESCRIPTION OF THE DRAWINGS

The above and other objectives, features and advantages of the present disclosure will become more apparent from the description of embodiments of the present disclosure below with reference to the accompanying drawings, wherein.

DETAILED DESCRIPTION OF EMBODIMENTS OF THE DISCLOSURE

Various embodiments of the present disclosure will be described in more detail below with reference to the accompanying drawings. In the various accompanying drawings, the same elements are denoted by the same or similar drawing symbols. For the sake of clarity, the various parts in the accompanying drawings are not drawn to scale. In addition, some well-known parts may not be shown.

Many specific details of the present disclosure such as structures, materials, dimensions, processing techniques and techniques of corresponding components are described hereinafter, in order to make the disclosure better understood. However, as will be understood by those skilled in the art, the disclosure may be practiced without these specific details.

It should be understood that in the following description, "circuit" refers to a conductive circuit formed by at least one element or sub-circuit through electrical or electromagnetic connection. When an element or circuit is referred to as being "connected to"/"coupled to" another element or an element/circuit is "connected"/"coupled" between two nodes, it can be directly coupled or connected to another or an intermediate element may be present, and the elements may be connected physically, logically, or both. Instead, when an element is referred to as being "directly coupled to" or "directly connected to" another element, it is meant that there is no intermediate element present between the elements.

In this application, a switch transistor is a transistor that operates in a switching mode to provide a current path, and comprises one selected from a bipolar transistor or field effect transistor. A first current terminal and a second current terminal of the switch transistor are respectively a high voltage potential terminal and a low voltage potential terminal on the current path, and a control terminal of the switch transistor is configured to receive a driving signal so as to control the switch transistor to be turned on or off.

The present disclosure will be further described below in conjunction with one or more drawings and embodiments.

Figure 1:
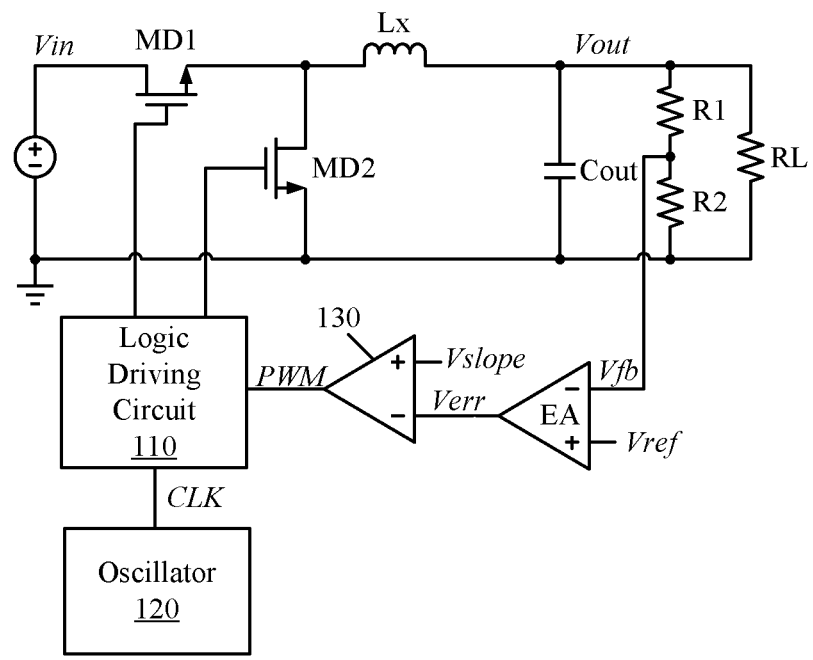
FIG. 1 illustrates a schematic structural diagram of a switching converter according to the prior art.
Figure 2:
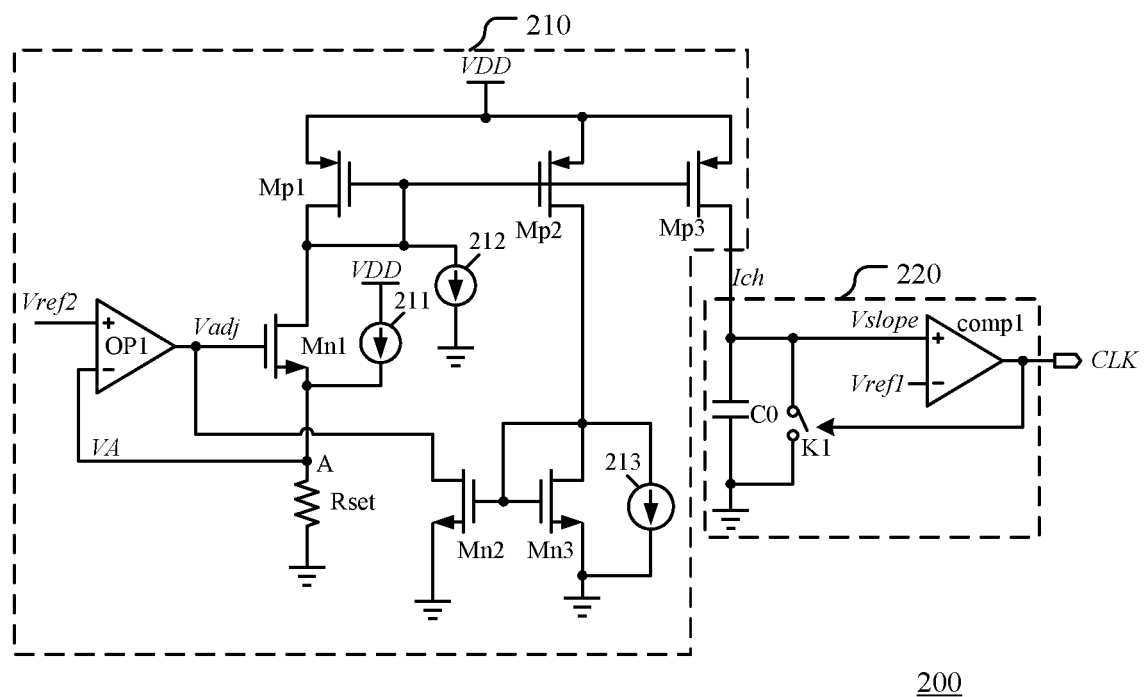
FIG. 2 illustrates a circuit diagram of an oscillator of a switching converter according to a first embodiment of the present disclosure.

FIG. 2 illustrates a circuit diagram of an oscillator of a switching converter according to a first embodiment of the present disclosure. As shown in FIG. 2, an oscillator 200 includes a charging current generating circuit 210 and a clock signal generator circuit 220.

The charging current generating circuit 210 comprises transistors Mp1 to Mp3, transistors Mn1 to Mn3, current sources 211 to 213, an operational amplifier OP1 and a variable resistor Rset. The transistor Mp1, the transistor Mn1 and the variable resistor Rset are connected in series between a power supply voltage VDD and ground. The transistors Mp3 and Mp1 constitute a current mirror, a first terminal of the transistor Mp3 is connected to the power supply voltage VDD, and a second terminal of the transistor Mp3 is configured to supply a charging current Ich. A first terminal of the current source 211 is connected to the power supply voltage VDD and a second terminal of the current source 211 is connected to a node A. A first terminal of the current source 212 is connected to a control terminal of the transistor Mp1 and a second terminal of the current source 212 is connected to the ground. A non-inverting input terminal of the operational amplifier OP1 is configured for receiving a second reference voltage Vref2, an inverting input terminal of the operational amplifier OP1 is connected to the first terminal of the variable resistor Rset to the node A, and an output terminal of the operational amplifier OP1 is connected to a control terminal of the transistor Mn1. The operational amplifier OP1 is used for providing a feedback adjustment signal Vadj to the transistor Mn1 according to a voltage VA at the node A and the second reference voltage Vref2. The feedback adjustment signal Vadj is used for controlling a current flowing through the transistor Mn1 according to a resistance value of the variable resistor Rset, thereby regulating a current value of the charging current Ich to achieve a purpose of changing a frequency of the clock signal CLK.

The clock signal generator circuit 220 comprises a charging capacitor C0, a controllable switch K1 and a comparator comp1. The charging capacitor C0 is connected between the output terminal of the charging current generating circuit 210 and ground, a first terminal of the controllable switch K1 is connected to a first terminal of the charging capacitor C0, and a second terminal of the controllable switch K1 is configured for providing a discharge path from the first terminal of the charging capacitor C0 to ground. A non-inverting input terminal of the comparator comp1 is connected to a connection node between the controllable switch K1 and the charging capacitor C0 to receive a slope voltage Vslope, an inverting input terminal of the comparator comp1 is configured to receive a first reference voltage Vref, and an output terminal of the comparator comp1 is configured to output the clock signal CLK.

In an initial state, the charge on the charging capacitor C0 is zero, and the slope voltage Vslope is lower than the first reference voltage Vref1. The output of the comparator comp1 is at a low voltage level, and the controllable switch K1 is turned off. The charging current Ich charges the charging capacitor C0, and when the slope voltage Vslope is greater than the first reference voltage Vref1, the output of the comparator comp1 flips, and at this time the controllable switch K1 is turned on, the charging capacitor C0 starts to be discharged to ground. Since the discharge current of the charging capacitor C0 is far greater than the charging current Ich, the slope voltage Vslope begins to decrease. When the slope voltage Vslope drops to slightly lower than the first reference voltage Vref1, the output of the comparator comp1 flips again, and the controllable switch K1 is turned off, the charging current Ich starts charging the charging capacitor C0 again to start a next oscillation period.

The transistors Mp2, Mn2 and Mn3, and current sources 211 to 213 in the charging current generating circuit 210 form a current limiting module, which is configured for limiting the current value of the charging current Ich to a preset current value when the variable resistor Rset is shorted or opened. A first terminal of the transistor Mn2 is connected to the output terminal of the operational amplifier OP1, and a second terminal of the transistor Mn2 is grounded. The transistor Mp2 and Mn3 are sequentially connected in series between the power supply voltage VDD and ground. The transistor Mp2 and Mp1 form a current mirror, and the transistor Mn3 and Mn2 form another current mirror. The current source 211 is connected between the power supply voltage VDD and the second terminal of the transistor Mn1, the current source 212 is connected between the control terminal of the transistor Mp1 and ground, and the current source 213 is connected in parallel between the first terminal and the second terminal of the transistor Mn3.

In the present embodiment, each of the transistors Mp1 to Mp3 is realized, for example, by P-type MOSFET (P-Metal-Oxide-Semiconductor Field-Effect Transistor) whose first terminal, second terminal and control terminal are source, drain and gate, respectively. And each of the transistors Mn1 to Mn3 is realized, for example, by N-type MOSFET (N-Metal-Oxide-Semiconductor Field-Effect Transistor) whose first terminal, second terminal and control terminal are drain, source and gate, respectively.

The following is a detailed explanation of an operating principle of the oscillator in the first embodiment of the present disclosure, with reference to FIG. 2. As shown in FIG. 2, when the oscillator 200 is normally operated, the charging current Ich generated by the charging current generating circuit 210 is:

$$Ich=I_{Mp1}=I_{Mn1}+I2,$$

where $I_{Mp1}$ represents a current flowing through the transistor Mp1, $I_{Mn1}$ represents a current flowing through the transistor Mn1 and I2 represents the current of the current source 212.

Further, the current $I_{Mn1}$ flowing through the transistor Mn1 is:

$$I_{Mn1}=Vref2/Rset-I1,$$

where I1 represents the current of the current source 211, and the charging current Ich generated by the charging current generating circuit 210 can be obtained by combining the above formula as follows:

$$Ich=Vref2/Rset+I2-I1$$

When the output currents of the current source 211 and 212 are equal, the charging current Ich can be obtained as:

$$Ich=Vref2/Rset$$

When the oscillator 200 is abnormally operated, for example, when the variable resistor Rset is shorted (Rset=0), the transistor Mn2 in the current limiting module is turned on, and the transistor Mn2 pulls down the feedback adjustment signal Vadj, limiting the maximum value of the charging current Ich to:

$$Ich,max=I3,$$

where the current I3 represents the output current of the current source 213.

When the variable resistor Rset is opened (Rset=∞), the transistor Mn1 is turned off, and the current source 212 limits the minimum value of the charging current Ich to:

$$Ich,min=I2$$

In summary, the oscillator 200 according to embodiments of the present disclosure limits the maximum and minimum values of the charging current Ich, thereby restricting the frequency variation range of the clock signal and avoiding the drastic change of circuit switching frequency when the external variable resistor is shorted or opened, which is beneficial to improving the stability of the system.

Figure 3:
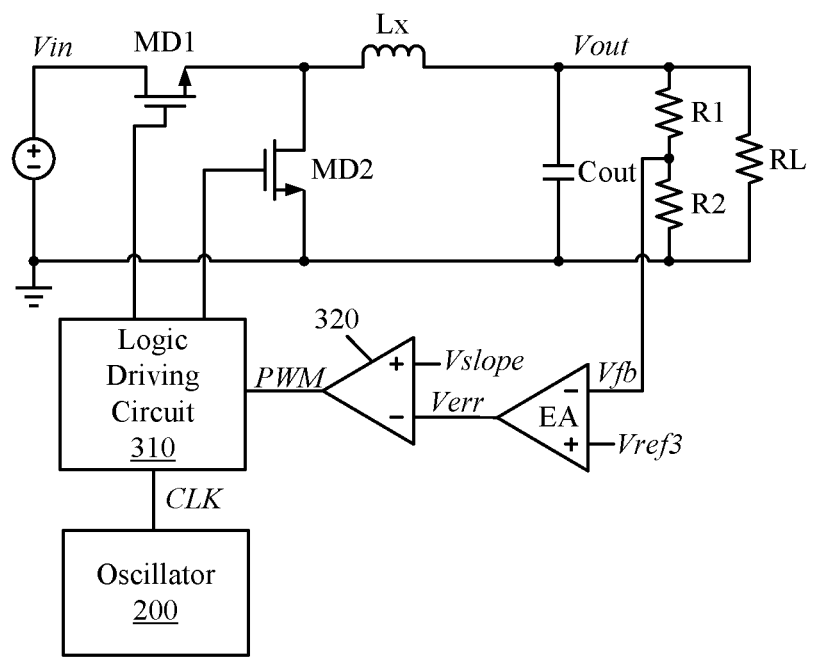
FIG. 3 illustrates a schematic structural diagram of a switching converter according to a second embodiment of the present disclosure.

FIG. 3 illustrates a schematic structural diagram of a switching converter according to a second embodiment of the present disclosure. As shown in FIG. 3, the switching converter 300 comprises a control circuit and a power stage circuit. The control circuit comprises an error amplifier EA, a logic driving circuit 310, a PWM comparator 320 and an oscillator 200.

The error amplifier EA is used for generating an error signal Verr according to a feedback voltage Vfb of the output voltage Vout and a reference voltage Vref. The PWM comparator compares a slope voltage Vslope with the error signal Verr to obtain a comparison result and generates a pulse width modulated signal PWM according to the comparison result. The logic driving circuit 310 generates a switch driving signal according to the pulse width modulated signal PWM and a clock signal CLK supplied from the oscillator 200, the switch driving signal is used to control power switch transistors MD1 and MD2 to be turned on and off. Those skilled in the art will appreciate that the logic driving circuit 310 may be implemented by different architectures. Meanwhile the control principle of the switching converter 300 of synchronously rectified buck type should be well known to those skilled in the art.

The oscillator 200 is implemented, for example, by the oscillator according to the first embodiment disclosed herein, which limits the maximum and minimum values of the charging current Ich, thereby restricting a range of frequency variation of the clock signal, which avoids drastic change on the switching frequency of the circuit when the external variable resistor is shorted or opened, and is advantageous in improving the stability of the system.

The power switch transistors MD1 and MD2 in the above embodiments may be various transistors, such as NPN Darlington transistors, NPN-type bipolar transistors, PNP-type bipolar transistors, N-type MOSFETs, P-type MOSFETs, or the like. The control circuit is, for example, packaged as an IC chip. In some embodiments, the power switch transistors MD1 and MD2 in the power stage circuit are also packaged in the IC chip.

In summary, the embodiment of the present disclosure provides a switching converter and an oscillator of a switching converter. The oscillator comprises a charging current generating circuit and a clock signal generator circuit. The charging current generating circuit comprises a variable resistor and a current limiting module, and the current limiting module is used to limit a current value of the charging current to a preset current value when the variable resistor is shorted or opened, thereby avoiding drastic change of a switching frequency of the circuit when the external variable resistor is shorted or opened, so as to improve the stability of the system.

Although the above embodiments in combination with FIG. 3 describe a step-down topology switching converter, it should be understood that the oscillator 200 according to some embodiments of the present disclosure can also be applied in other topologies of switching converters, including but not limited to buck topology, boost topology, or buck-boost topology.

It should be noted that in this disclosure, relational terms, such as "first" and "second" are only used to distinguish one entity or operation from another entity or operation, and do not necessarily require or imply any such actual relationship or order between these entities or operations. Moreover, the terms "include", "comprise" or any other variants thereof are intended to cover non-exclusive inclusion, so that a process, method, article or equipment that includes a series of elements not only includes those elements, but may also further include other elements that are not explicitly listed or inherent to such a process, method, article, or equipment. If there are no more restrictions, the element defined by the sentence "including/comprising a . . . " does not exclude the existence of other identical elements in the process, method, article, or equipment that includes the element.

According to the embodiments of the present disclosure described above, these embodiments do not describe all the details, nor do they limit the present disclosure only to the specific embodiments described. Obviously, according to the above description, many modifications and changes can be made. This specification selects and specifically describes these embodiments in order to better explain the principles and practical applications of the present disclosure, so that those skilled in the art can make good use of the present disclosure and make modifications based on the present disclosure. The present disclosure is only limited by the claims and their full scope and equivalents.

What is claimed is:

1. An oscillator of a switching converter, wherein the oscillator comprises:
    a charging current generating circuit, configured to generate a charging current;
    a clock signal generator circuit, configured to generate a slope voltage according to the charging current, compare the slope voltage with a first reference voltage to obtain a comparison result, and generate a clock signal according to the comparison result,
    wherein, the charging current generating circuit comprises a variable resistor and a current limiting module, which is configured to limit a current value of the charging current to a preset current value when the variable resistor is shorted or opened,
    wherein the charging current generating circuit further comprises:
    a first transistor and a second transistor being connected in series between a power supply voltage and the variable resistor;
    a fourth transistor being connected between the power supply voltage and the clock signal generator circuit, wherein the fourth transistor and the first transistor form a current mirror, and a second terminal of the fourth transistor is used for supplying the charging current; and
    an operational amplifier, which has a non-inverting input terminal being used for receiving a second reference voltage, an inverting input terminal being connected to a first node with a first terminal of the variable resistor, and an output terminal being connected to a control terminal of the second transistor,
    wherein, the operational amplifier is configured to provide a feedback adjustment signal to the second transistor according to a node voltage of the first node and the second reference voltage, to adjust the current value of the charging current,
    wherein the current limiting module comprises:
    a first current source, having a first terminal being connected to the power supply voltage and having a second terminal being connected to the first node.

2. The oscillator according to claim 1, wherein the current limiting module is configured to adjust the feedback adjustment signal when the variable resistor is shorted or opened, so as to limit the current value of the charging current to the preset current value.

3. The oscillator according to claim 2, wherein the current limiting module further comprises:
    a second current source, having a first terminal being connected to a control terminal of the first transistor and having a second terminal being grounded;

a third transistor and a sixth transistor being connected in series between the power supply voltage and ground, wherein the third transistor and the first transistor form a current mirror; and a fifth transistor being connected between the output terminal of the operational amplifier and ground, wherein the fifth transistor and the sixth transistor form a current mirror.

4. The oscillator according to claim 3, wherein the charging current generating circuit further comprises a third current source being connected in parallel between a first terminal and a second terminal of the sixth transistor.

5. The oscillator according to claim 3, wherein output currents of the first current source and the second current source are equal.

6. The oscillator according to claim 3,
wherein each of the first transistor, the third transistor and the fourth transistor is a P-type metal oxide semiconductor field effect transistor,
wherein each of the second transistor, the fifth transistor and the sixth transistor is an N-type metal oxide semiconductor field effect transistor.

7. The oscillator according to claim 1, wherein the clock signal generator circuit comprises:
a charging capacitor being connected between an output terminal of the charging current generating circuit and ground;
a controllable switch, having a first terminal being connected to a first terminal of the charging capacitor, and having a second terminal being grounded; and
a comparator, having a non-inverting input terminal being connected to a connection node between the controllable switch and the charging capacitor, to receive the slope voltage, having an inverting input terminal for receiving the first reference voltage, and having an output terminal for outputting the clock signal,
wherein the controllable switch is controlled to be turned on and off in accordance with the clock signal.

8. A switching converter, comprising:
a power stage circuit, comprising a power switch transistor, and configured to convert an input voltage into an output voltage;
an error amplifier, configured to generate an error signal according to a third reference voltage and a feedback voltage of the output voltage;
a PWM comparator, configured to compare the error signal with a slope voltage, to generate a pulse width modulated signal;
a logic driving circuit, configured to generate a switch driving signal according to the pulse width modulation signal and a clock signal, and control the power switch transistor to be turned on and off; and
the oscillator according to claim 1.

9. The switching converter according to claim 8, wherein a topology of the power stage circuit is selected from a group consisting of a Buck topology, a Boost topology, or a Buck-Boost topology.

10. The switching converter according to claim 8, wherein the current limiting module is configured to adjust the feedback adjustment signal when the variable resistor is shorted or opened, so as to limit the current value of the charging current to the preset current value.

11. The switching converter according to claim 10, wherein the current limiting module further comprises:
a second current source, having a first terminal being connected to a control terminal of the first transistor and having a second terminal being grounded;
a third transistor and a sixth transistor being connected in series between the power supply voltage and ground, wherein the third transistor and the first transistor form a current mirror; and
a fifth transistor being connected between the output terminal of the operational amplifier and ground, wherein the fifth transistor and the sixth transistor form a current mirror.

12. The switching converter according to claim 11, wherein the charging current generating circuit further comprises a third current source being connected in parallel between a first terminal and a second terminal of the sixth transistor.

13. The switching converter according to claim 11, wherein output currents of the first current source and the second current source are equal.

14. The switching converter according to claim 11,
wherein each of the first transistor, the third transistor and the fourth transistor is a P-type metal oxide semiconductor field effect transistor,
wherein each of the second transistor, the fifth transistor and the sixth transistor is an N-type metal oxide semiconductor field effect transistor.

15. The switching converter according to claim 8, wherein the clock signal generator circuit comprises:
a charging capacitor being connected between an output terminal of the charging current generating circuit and ground;
a controllable switch, having a first terminal being connected to a first terminal of the charging capacitor, and having a second terminal being grounded; and
a comparator, having a non-inverting input terminal being connected to a connection node between the controllable switch and the charging capacitor, to receive the slope voltage, having an inverting input terminal for receiving the first reference voltage, and having an output terminal for outputting the clock signal,
wherein the controllable switch is controlled to be turned on and off in accordance with the clock signal.

* * * * *